UNITED STATES PATENT OFFICE.

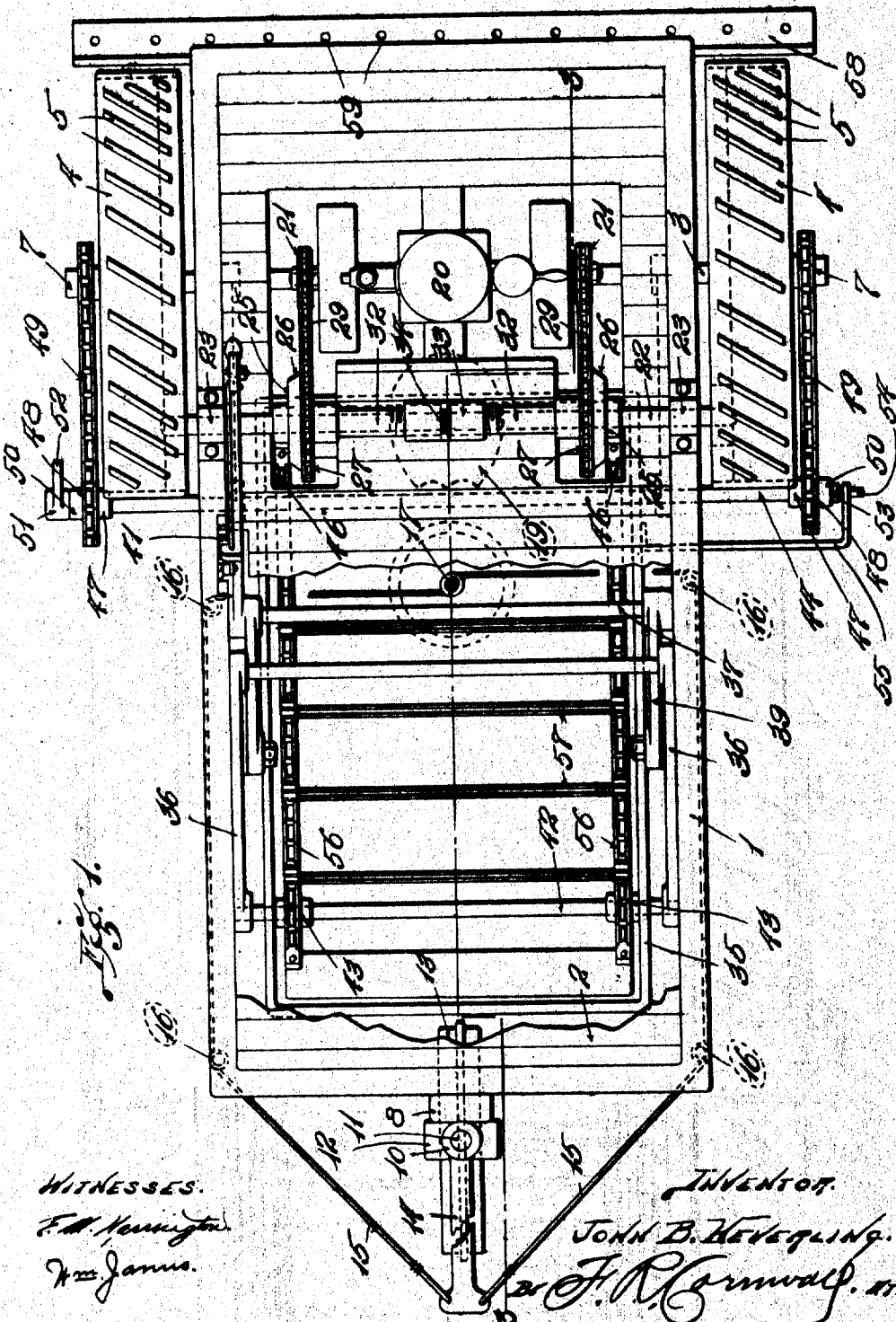

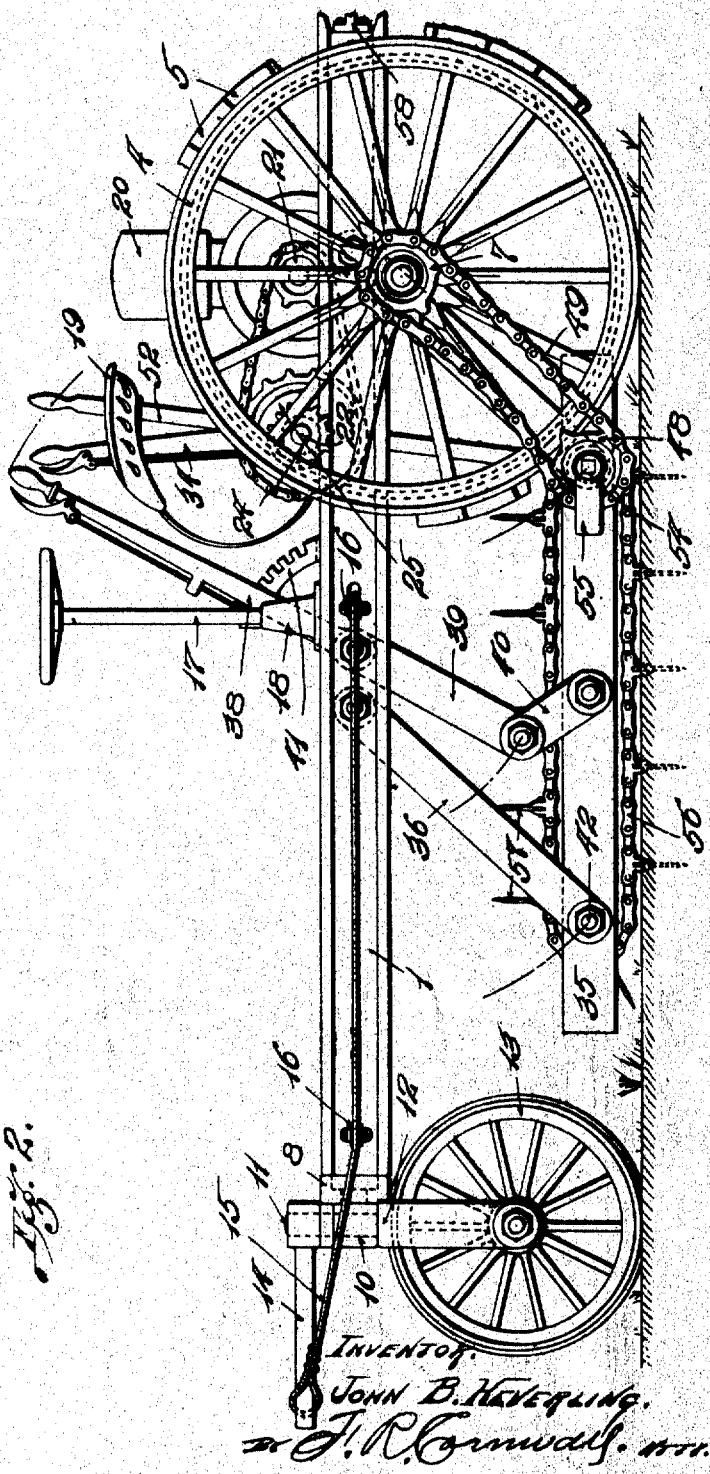

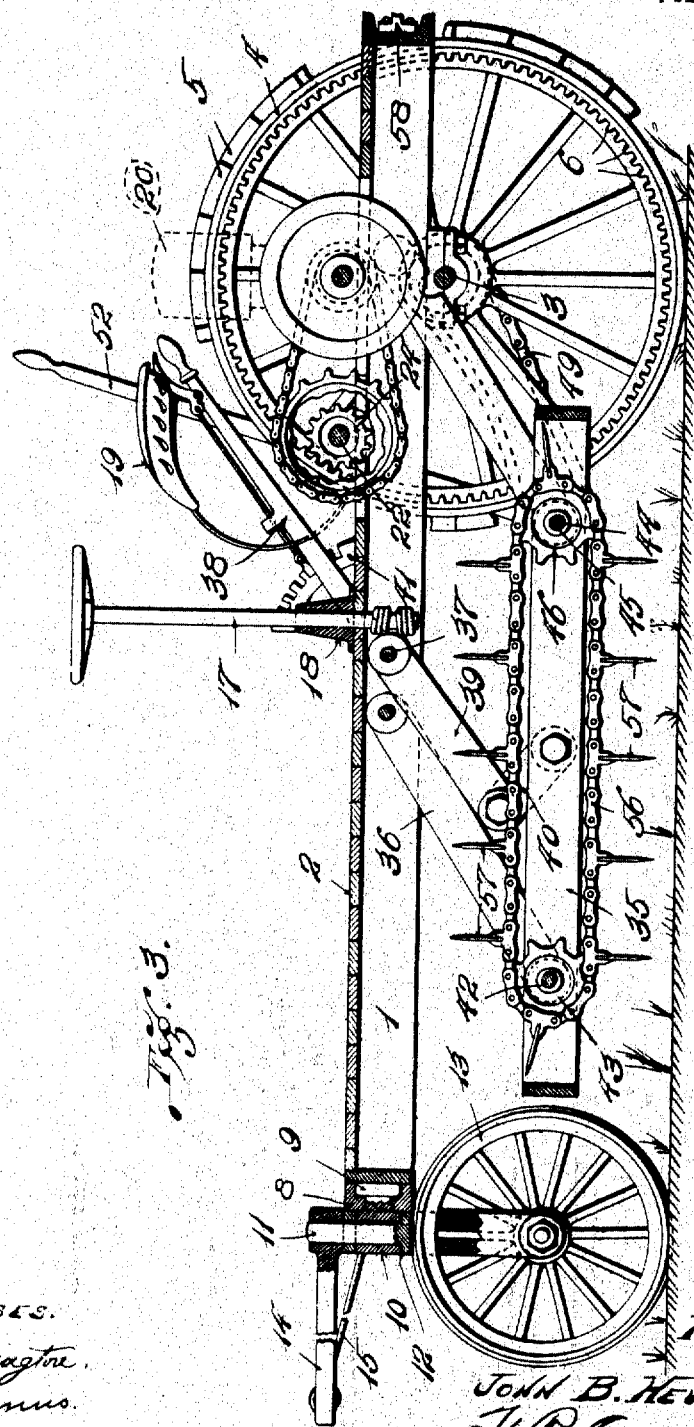

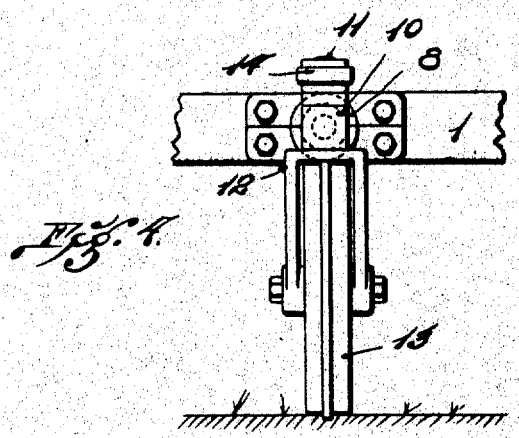
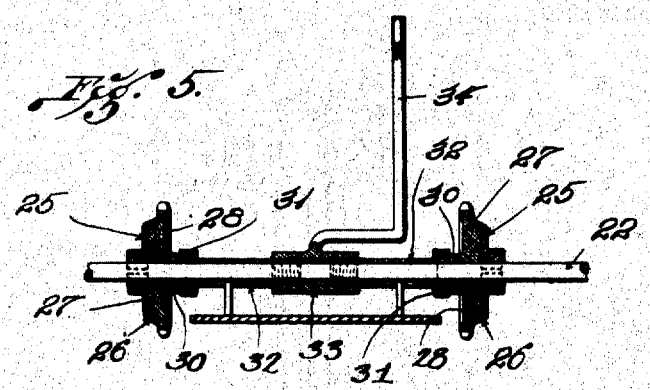
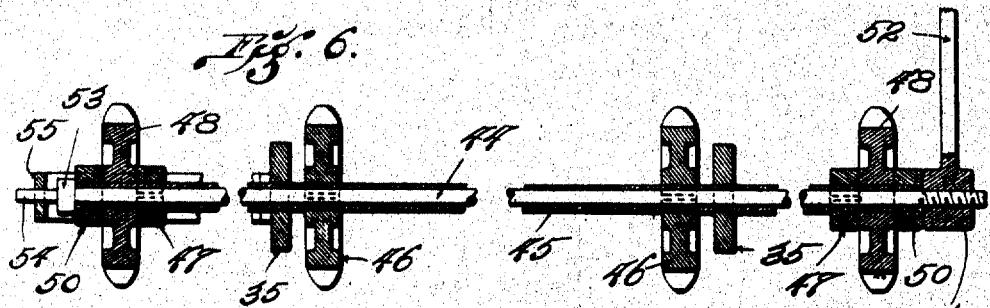

JOHN B. HEVERLING, OF ST. LOUIS, MISSOURI.

TRACTION-MOTOR.

995,538. Specification of Letters Patent. Patented June 20, 1911.

Application filed March 7, 1910. Serial No. 547,871.

*To all whom it may concern:*

Be it known that I, JOHN B. HEVERLING, a citizen of the United States, residing at St. Louis, Missouri, have invented a certain new and useful Improvement in Traction-Motors, of which the following is a full, clear, and exact description, such as will enable others skilled in the art to which it appertains to make and use the same, reference being had to the accompanying drawings, forming part of this specification, in which—

Figure 1 is a plan view of a traction motor of my improved construction, the parts being broken away for the purpose of more clearly illustrating the construction of the motor. Fig. 2 is a side elevation of a traction motor. Fig. 3 is a vertical section taken approximately on the line 3—3 of Fig. 1. Fig. 4 is a front elevation of the steering wheel of my improved traction motor. Fig. 5 is a detail section taken lengthwise, on the counter-shaft of the traction motor and showing the friction clutches thereon, and the means for operating. Fig. 6 is a detail section taken lengthwise on a second counter-shaft, and showing a pair of sprocket wheels on said shaft, and the means for locking said sprocket wheels to the shaft.

My invention relates to a traction motor to be used principally for heavy hauling purposes upon a road or in the field. The principal object of my invention being to equip the motor carriage with means adapted to engage the ground as the motor moves forward, thus affording ample anchorage and stability for the traction motor, and thereby materially increasing the draft of the apparatus particularly when the same is passing over comparatively soft ground.

My improved traction motor is particularly designed for carrying heavy loads and pulling loaded wagons and the like over roads and for pulling gang plows, cultivators, harrows and the like in the field.

To the above purposes my invention consists in certain novel features of construction and arrangement of parts hereinafter more fully described and claimed.

Referring by numerals to the accompanying drawings 1 designates the frame of the traction motor, the same being preferably constructed of metal in rectangular form, and said frame is covered with a suitable flooring 2. Journaled for rotation in suitable bearings arranged beneath the rear end of the frame 1 is a rear axle 3 on the ends of which are fixed traction wheels 4 having the usual wide tires on the outer faces of which are arranged the usual traction lugs or projections 5. Formed on or fixed to the inner face of each wheel rim is a series of teeth 6 forming an internal gear wheel and formed on or fixed to the outer portions of the hubs of the wheels 4 are sprocket wheels 7.

Fixed on the front end of the frame 1 is a bearing 8 in which is journaled a horizontally disposed stud 9, and formed integral with and projecting forward from this stud 9 is a vertically disposed bearing 10 in which is journaled a short shaft 11 provided on its lower end with a yoke 12. Journaled within this yoke 12 is a wheel 13 which forms the steering wheel of the traction motor.

Fixed on the upper end of the shaft 11 and projecting forwardly therefrom is a lever 14. Fixed to the forward end of this lever 14 are the ends of a pair of cables or chains 15, which extend rearward along the sides of the forward portion of the frame 1 bearing upon suitable grooved pulleys 16, and the rear ends of these cables or chains are wound upon the lower end of a vertically disposed steering post 17 which latter is arranged for rotation in a bearing 18, located at a point adjacent the central portion of the machine. Arranged on the flooring 2 immediately to the rear of this steering post 17 is a seat 19 for the operator of the traction motor. Positioned on the floor 2 above the rear axle 3 is a high power motor 20 preferably of the internal combustion type, and fixed on the engine shaft are small sprocket wheels 21.

22 designates a counter-shaft which is journaled for rotation in suitable bearings 23 located on the frame 1 in front of the engine, and fixed on the ends of this counter-shaft are pinions 24 which mesh with internal gear teeth 6. Fixed on this shaft 22 is a pair of disks 25 on the edge of which are formed inclined flanges 26. Loosely mounted on the shaft 22 immediately adjacent the disks 25 are sprocket wheels 27 on the outer faces of each of which is formed a beveled shoulder 28, which is adapted to engage with the face of the corresponding inclined flange 26. Sprocket chains 29 connect the corresponding pairs of sprocket wheels 21 and 27.

Formed integral with the inner faces of the sprocket wheels 27 are grooved hubs 30 and engaging in the grooves in these hubs are flanges 31 formed on the outer ends of a pair of sleeves 32 which sleeves have a pin and slot connection with the frame of the machine, whereby they slide lengthwise upon said shaft only, being prevented from rotation by engagement with the stationary pins on the frame. The inner end of one of these sleeves is provided with a right hand thread, and the adjacent end of the opposite sleeve is provided with a left hand thread. The threaded ends of these sleeves are united by a tubular coupling 33, which is interiorly screw threaded to correspond with the threaded ends of the sleeves 32, and formed on or fixed to said tubular coupling is a vertically disposed handle 34 which extends upward to the right hand side of the operator's seat 19.

35 designates a rectangular frame, which occupies a position beneath the center of the frame of the traction motor, said frame 35 being pivotally carried by the lower ends of a pair of parallel bars 36, the upper ends of which are pivotally connected to the sides of the frame 1.

Journaled in the sides of the frame 1 adjacent the lower end of the steering post 17 is a rock shaft 37 and fixed on the right hand end thereof is the lower end of a hand lever 38, which projects upward and rearward to the right of the operator's seat 19. Fixed on this rock shaft 37 are links 39 which project forward and downward, and pivotally connected to the lower ends of these links 39 are short links 40, the lower ends of which are pivotally connected to the sides of the frame 35 at the center thereof. The mechanism just described provides means for raising and lowering the frame 35 bodily; that is, the entire frame may be moved to a position substantially parallel with its operative position.

The frame 35 and parts carried thereby are held in an elevated position by means of a latch on the hand lever 38 engaging the teeth of a segmental rack 41 fixed on the side of the frame 1.

Journaled in the sides of the frame 35 adjacent the front end thereof is a transversely disposed shaft 42 upon which is fixed a pair of sprocket wheels 43.

44 designates a shaft or rod which is transversely disposed in the rear portion of the frame 35, and loosely mounted upon said shaft or rod is a sleeve 45, the same being mounted to rotate freely in suitable bearings formed in the sides of said frame 35. Fixed to this sleeve 45 just inside the side members of the frame 35 are sprocket wheels 46 which are in alinement with the sprocket wheels 43. Fixed on the sleeve 45 outside the frame 35 are collars 47 and loosely mounted on said sleeve outside these collars are sprocket wheels 48 which are in alinement with the sprocket wheels 7 on the hubs of the traction wheels 4, and connecting the corresponding pairs of sprocket wheels 7 and 48 are sprocket chains 49.

Loosely mounted on the sleeve 45 outside the sprocket wheels 48 are collars 50. The right hand end of the rod 44 projects a short distance beyond the corresponding end of the sleeve 45 and said projecting end is exteriorly screw threaded, and mounted on this threaded end of said rod is a nut 51 from which projects a vertically disposed handle 52. The opposite end of the rod 44 projects a short distance beyond the corresponding end of the sleeve 45, and fixed on said projecting end is a head 53, which normally bears against the corresponding collar 50. The end of the rod 44 which projects beyond the head just described is made square or non-circular, as designated by 54, and said non-circular portion is seated in a bracket 55 attached to the corresponding side of the frame 35. When the nut 51 is rotated by means of the handle 52, the collars 50 will be drawn toward one another, and as a result the sprocket wheels 48 will be clamped between said collars and the fixed collars 47, and thus said sprocket wheels will rotate with the sleeve 45.

Connecting the corresponding pairs of sprocket wheels 43 and 46 are heavy sprocket chains 56, and fixed to certain of the lengths thereof and arranged at equal distances apart are transversely disposed plates 57, the outer edges of which are sharpened, thus forming blades which are adapted to engage in the ground over which the traction motor is passing, thus giving said traction motor firm anchorage and stability while the same is pulling a heavy load.

Fixed on the rear end of the frame 1 of the machine is a transversely disposed bar 58 in which is formed a row of apertures 59, thus providing means for attaching chains, cables or hooks and like connections which lead to the wagons or farming implements drawn by the traction motor.

During operation the rotary motion of the engine shaft is imparted to the loosely mounted sprocket wheels 27 by means of the chains 29 connecting the sprocket wheels 21 and said sprocket wheels 27, thus said sprocket wheels 27 are driven continuously by the engine. To lock these sprocket wheels on the shaft 22, and to impart motion to the latter the operator manually engages the lever 34 and by shifting the same partially rotates the tubular coupling 33, thereby moving the sleeves 32 outward and forcing the beveled shoulders 28 on the sprocket wheels 27 into frictional engagement with the inclined flanges 26 on the disks 25. As soon as these parts are locked to one another through frictional engagement the countershaft 22 will be rotated and the pinions 24 fixed on the ends of said counter-shaft will engage with the teeth 6 forming the circular racks on the traction wheels 4, and thus said traction wheels will be driven, and the traction motor will move forward. The operator occupies the seat 19 and by proper manipulation of the steering post 17 swings the wheel 13 to one side or the other thereby guiding the forward movement of the traction motor.

Where the traction motor is used for conveying material from one point to another said material is loaded onto the flooring or platform 2 immediately in front of the steering post 17, and when the traction motor is used for pulling loaded wagons, gang plows, cultivators and the like said wagons or plows are attached by chains or cables to the bar 58.

Where my improved traction motor is being used for comparatively light or ordinary work, and is being operated on a fairly good roadway or on comparatively hard ground the traction element comprising the sprocket chains 56 and transverse blades 57 is not needed, and while not in use occupies an elevated position as seen in Fig. 3. When the motor is utilized for pulling heavy loads or while traversing soft ground the pulling element is lowered by releasing the latch on the handle lever 38 from the toothed segment 41, and when this latch is utilized the frame 35 and parts carried thereby will by gravity swing downward into the position shown in Fig. 2, and the plates 57 will engage in the ground over which the motor is passing.

To impart movement to the pulling element the operator manually engages the hand lever 52 and shifts the same so as to partially rotate the nut 51 on the threaded end of the rod 44. This action tends to move the rod 44 toward the nut 51, and as result the loosely mounted collars are forced against the hubs of the sprocket wheels 48, and said hubs are clamped between said collars 50, and the collars 47 which are fixed on the sleeve 45, thus the rotary motion of the traction wheels 4 is imparted to the sleeve 45 through the medium of the sprocket chains 49 operating on the sprocket wheels 7, and the sprocket wheels 48, which latter are as heretofore described, clamped upon said sleeve 45. As the sleeve 45 is rotated the endless chains 56 will be operated and consequently the blades 57 will engage in the ground over which the traction motor is passing. The blades 57 being thus embedded in the ground provide very substantial anchorage for the motor, and the full strength or power of the engine can be utilized for moving the traction motor forward and pulling the load.

A traction motor of my improved construction is very simple, is easily operated and provides means whereby heavy loads are readily transported. My improved machine is particularly adapted for use in the field for pulling gang plows, cultivators, harrows and the like, and when the apparatus is operated at a comparatively low speed and the frame 35 is lowered to permit the blades 57 to engage in the ground the maximum power exerted by the engine is utilized for pulling the implements attached to the traction motor.

By my improved construction, I am able to produce a machine of comparatively light weight, which has great traction and pulling power, and this is a decided advantage over the prevailing types of traction engines, inasmuch as in said prevailing types a comparatively large per cent. of the power developed by the engine is consumed in moving the weight of the carriage, thereby leaving a small percentage of power to do the actual work of pulling. Such objection is entirely overcome in a machine constructed as herein shown and described.

I claim:

1. The combination with a carriage, a driving device therefor, of a frame supported in a substantially horizontal position beneath the carriage, a pair of shafts supported by the frame, sprocket wheels arranged thereon, chains operating on said sprocket wheels, plates fixed to said chains, and means on the carriage adapted to move the frame bodily to a substantially parallel position.

2. The combination with a motor driven carriage, of a frame, supported beneath the carriage, parallel links connected to the carriage and to each end of the frame, a pair of endless chains arranged for operation in said frame, and projections on said chains which are adapted to enter the ground over which the carriage is passing.

3. The combination with a motor driven carriage, of a frame supported beneath the carriage, parallel links connected to the carriage and to each end of the frame, and a lever connected to the center of the frame adapted to move it vertically, a pair of endless chains arranged for operation in said frame, and projections on said chains adapted to engage the ground over which the carriage is passing.

4. The combination with a motor driven carriage having an axle with wheels thereon, a frame beneath the carriage, means connecting said carriage and frame, whereby the frame may be bodily moved vertically to parallel positions, a pair of endless chains mounted on said frame having means thereon adapted to engage the ground over which the carriage passes, and driving means connecting said axle with the chains.

5. The combination with a motor driven carriage, of an endless pulling element supported beneath the carriage and adapted to engage with the ground over which the carriage is passing, driving connection from the motor on the carriage to said pulling element, comprising a hollow shaft having driving and driven means thereon, a rod extending through the shaft, and means connected to the rod to clamp the driving to the driven means.

6. The combination with a carriage, a motor for driving said carriage, driving connections from the motor to said carriage comprising a shaft, driving devices mounted on said shaft, gear wheels loosely mounted on said shaft adjacent each driving device, sleeves connected with said gear wheels and mounted upon said shaft, said sleeves being reversely threaded, and a lever adapted to engage the threads of each sleeve to engage each gear with its adjacent driving device on the shaft.

In testimony whereof I hereunto affix my signature in the presence of two witnesses, this 2nd day of March, 1910.

JOHN B. HEVERLING.

Witnesses:
M. P. SMITH,
ALMA GEBHART.

---

Copies of this patent may be obtained for five cents each, by addressing the "Commissioner of Patents, Washington, D. C."